US009404385B2

(12) United States Patent
Rowe

(10) Patent No.: US 9,404,385 B2
(45) Date of Patent: Aug. 2, 2016

(54) SHAFT BREAK DETECTION

(71) Applicant: ROLLS-ROYCE PLC, London (GB)

(72) Inventor: Arthur Laurence Rowe, Derby (GB)

(73) Assignee: ROLLS-ROYCE PLC, London (GB)

( * ) Notice: Subject to any disclaimer, the term of this patent is extended or adjusted under 35 U.S.C. 154(b) by 824 days.

(21) Appl. No.: 13/658,411

(22) Filed: Oct. 23, 2012

(65) Prior Publication Data

US 2013/0152600 A1   Jun. 20, 2013

(30) Foreign Application Priority Data

Dec. 16, 2011   (GB) .................................. 1121639.7

(51) Int. Cl.
| | |
|---|---|
| *F01D 21/00* | (2006.01) |
| *F01D 17/06* | (2006.01) |
| *F01D 17/04* | (2006.01) |
| *F01D 21/14* | (2006.01) |
| *G01M 15/14* | (2006.01) |

(52) U.S. Cl.
CPC ................ *F01D 21/00* (2013.01); *F01D 17/04* (2013.01); *F01D 17/06* (2013.01); *F01D 21/14* (2013.01); *F05D 2270/091* (2013.01); *F05D 2270/304* (2013.01); *G01M 15/14* (2013.01)

(58) Field of Classification Search
CPC ......... F01D 17/04; F01D 17/06; F01D 17/08; F01D 17/085; F01D 21/04; F01D 21/003; F01D 21/045; F01D 21/06; F01D 21/14; F01D 21/00; F05D 2270/304; F05D 2270/09; F05D 2270/091; F05D 2270/021; F05D 2270/3013
See application file for complete search history.

(56) References Cited

U.S. PATENT DOCUMENTS

| | | | |
|---|---|---|---|
| 4,430,855 A | 2/1984 | Deneux et al. | |
| 4,454,754 A | 6/1984 | Zagranski et al. | |
| 5,363,317 A * | 11/1994 | Rice et al. ...................... | 702/34 |
| 6,176,074 B1 * | 1/2001 | Thompson et al. ............. | 60/773 |
| 6,494,046 B1 * | 12/2002 | Hayess ........................... | 60/779 |

FOREIGN PATENT DOCUMENTS

| | | |
|---|---|---|
| GB | 2 256 486 A | 12/1992 |
| JP | A-4-339106 | 11/1992 |
| WO | WO 99/64727 | 12/1999 |

OTHER PUBLICATIONS

Mar. 23, 2012 Search Report issued in British Patent Application No. GB1121639.7.

* cited by examiner

*Primary Examiner* — Richard Edgar
*Assistant Examiner* — Brian P Wolcott
(74) *Attorney, Agent, or Firm* — Oliff PLC

(57) ABSTRACT

A method to detect shaft break includes monitoring first and second parameters and defining a two-dimensional parameter space that is a function of the first and second parameters, the two-dimensional parameter space includes integration regions. The method also includes defining an integration function for each integration region. For measured values of the first and second parameters, the method determines the applicable integration region and applies the integration function to the first parameter to give an integration result; and then sets a shaft break signal to TRUE when the integration result exceeds a predetermined threshold. The present invention also provides a shaft break detection system.

19 Claims, 4 Drawing Sheets

SHAFT BREAK DETECTION

The present invention relates to a method of detecting shaft break. It is particularly, although not exclusively, related to detecting break of a shaft of a gas turbine engine.

It is an object of the present invention to provide a more accurate and more timely method of detecting shaft break.

Accordingly the present invention provides a method to detect shaft break comprising: monitoring a first parameter and a second parameter; defining a two-dimensional parameter space that is a function of the first and second parameters, the two-dimensional parameter space comprising integration regions; defining an integration function for each integration region; for measured values of the first and second parameters, determining the applicable integration region and applying the integration function to the first parameter to give an integration result; and setting a shaft break signal to TRUE when the integration result crosses a predetermined threshold.

Beneficially the method of the present invention effectively distinguishes shaft break events from surge or other events even at low engine powers because it is robust to variation in initial conditions.

Each of the first parameter and the second parameter may comprise the derivative of the shaft speed of a different shaft. The first parameter may comprise the derivative of the shaft speed of the shaft to which the method is applied. The second parameter may comprise the derivative of the shaft speed of a different shaft. Advantageously, these parameters are usually already measured on a gas turbine engine so no additional sensors are required.

The integration function may integrate one of the first and second parameters over time. There may be three integration regions. For one integration region, preferably a first of the integration regions, the integration function may comprise integrating over time the sum of the first parameter and a constant to saturate the integral. Preferably the constant is chosen to saturate the integral at zero so that a shaft break event causes the integral to plunge negative from a known initial value. For one integration region, preferably a second of the integration regions, the integration function may comprise integrating over time the first parameter. During shaft break events the integral in this region quickly becomes very negative so that it crosses the threshold in a short period. For one integration region, preferably a third of the integration regions, the integration function comprises no integration to freeze the integral. Beneficially this maintains the value previously calculated so that transient deviations from the normal parameter matching are distinguished from shaft break events.

The threshold may be set to distinguish surge and shaft break events. The threshold may be set within the range −15% to −30%. Preferably the threshold may be approximately −20%.

The present invention also provides a control system comprising the method described; a gas turbine engine comprising the method described; and a gas turbine engine comprising the control system that comprises the method described. The method may be applied to an intermediate pressure shaft system of the gas turbine engine.

The present invention also provides shaft break detection system comprising: a first measurement device to measure a first parameter; a second measurement device to measure a second parameter; a two-dimensional parameter space defined as a function of the first and second parameters, the two-dimensional parameter space comprising integration regions; a memory comprising an integration function for each integration region; a processor to receive measured values of the first and second parameters from the first and second measurement devices, determine the applicable integration region from the two-dimensional parameter space and apply the integration function to obtain an integration result; and a shaft break signal generator to generate a shaft break signal if the integration result crosses a predetermined threshold.

Beneficially the system of the present invention effectively distinguishes shaft break events from surge or other events even at low engine powers because it is robust to variation in initial conditions.

The first and second measurement devices may comprise rotational speed sensors to measure a shaft speed. The first measurement device may measure the rotational speed of the shaft to which the system is applied. The second measurement device may measure the rotational speed of a different shaft. Advantageously such measurement devices are usually provided on each shaft of a gas turbine engine.

There may be three integration regions. The memory may receive the first parameter from the first measurement device and the integration function may comprise an integration of the first parameter over time.

The threshold may be set to distinguish surge and shaft break events. The threshold may be set in the range −15% to −30%. Preferably the threshold is approximately −20%.

The present invention also provides a control system comprising the shaft break detection system described. The processor may comprise an engine control unit. The present invention may comprise a gas turbine engine comprising the shaft break system described and a gas turbine engine comprising the control system described. The first measurement device may be coupled to one shaft and the second measurement device may be coupled to a different shaft. Preferably the first measurement device may be coupled to the intermediate pressure shaft. The second measurement device may be coupled to the high pressure shaft or to the low pressure shaft.

The gas turbine engine may further comprise a fuel shut-off mechanism coupled to the shaft break signal generator, the fuel shut-off mechanism may be arranged to shut off fuel supply to the engine in response to the shaft break signal. Advantageously this mechanism enables safely controlled shut down of the engine in response to a shaft break event.

The present invention will be more fully described by way of example with reference to the accompanying drawings, in which.

Figure 1:
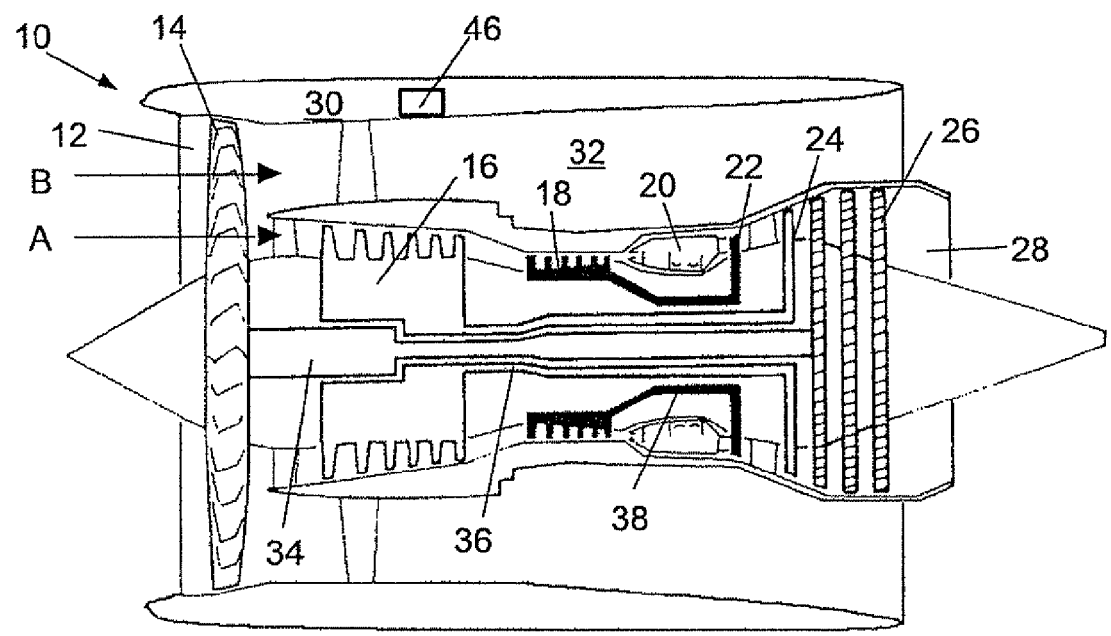
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an array of inlet guide vanes 40, an intermediate pressure compressor 16, a high pressure compressor 18, a combustor 20, a high pressure turbine 22, an intermediate pressure turbine 24, a low pressure turbine 26 and an exhaust nozzle 28. The fan 14 is coupled to the low pressure turbine 26 by a low pressure shaft 34. The intermediate pressure compressor 16 is coupled to the intermediate pressure turbine 24 by an intermediate pressure shaft 36. The high pressure compressor 18 is coupled to the high pressure turbine 22 by a high pressure shaft 38. The high pressure shaft 38 is coaxial with and radially outside the intermediate pressure shaft 36. Similarly, the intermediate pressure shaft 36 is coaxial with and radially outside the low pressure shaft 34.

A nacelle 30 surrounds the gas turbine engine 10 and defines, in axial flow B, a bypass duct 32. A control system 46, such as an electronic engine controller (EEC), is provided on the engine 10 and is configured to control aspects of the operation of the engine 10.

In rare circumstances one of the shafts 34, 36, 38 may break. When this occurs the fan 14 or compressor 16, 18 decelerates rapidly because it is no longer driven. However, the turbine 22, 24, 26 rapidly accelerates because the load on it is substantially reduced. This in turn may cause the turbine disc to burst releasing high energy debris and resulting in catastrophic failure of the engine 10. Where the engine 10 is used to power an aircraft the released high energy debris may not be captured and there is thus a risk of some debris impacting or piercing the fuselage of the aircraft. Therefore there is a need to identify shaft breakages and to shut down the engine 10 quickly by shutting off the fuel supply. Typically a shaft break event must be controlled in less than 1 second or the release of high energy debris cannot be reliably prevented. However, a shaft break event may be controlled in a slightly longer period when the engine 10 is operating at lower power when the shaft break event occurs.

Figure 2:
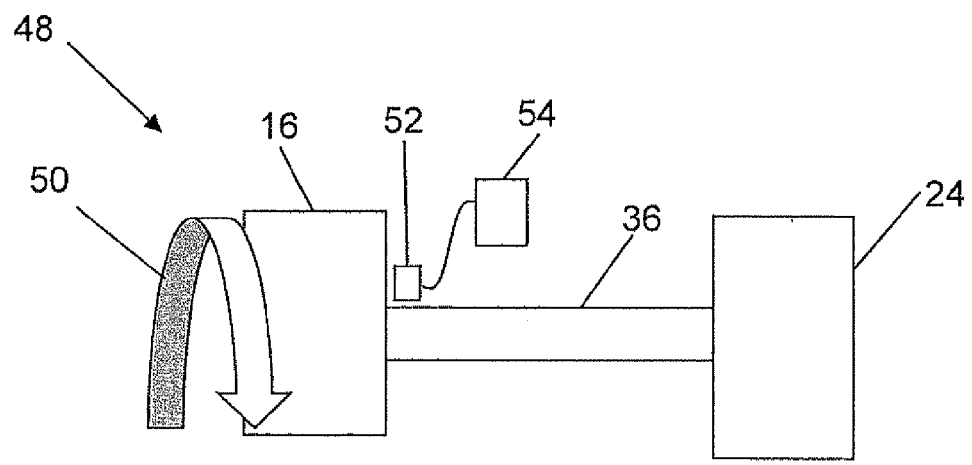
FIG. 2 and FIG. 3 are a schematic illustration of a shaft system in unbroken and broken configurations.

A simplistic illustration of a shaft system 48, for example the intermediate pressure shaft system, is shown in FIG. 2. The shaft system 48 comprises the intermediate pressure shaft 36 coupled between the intermediate pressure compressor 16 and the intermediate pressure turbine 24. The shaft system 48 rotates as a whole as indicated by arrow 50. A measuring device 52 is arranged to measure the rotational speed of the intermediate pressure shaft 34 and is coupled to a processor 54. The measuring device 52 is preferably a speed probe located close to the intermediate pressure compressor 16. The measuring device 52 may measure the rotational speed substantially continuously or may sample the rotational speed at defined intervals. This interval may be in the range 1 ms to 30 ms. Preferably samples are taken every 25 ms. The processor 54 receives the measured rotational speed from the measuring device 52 and processes it as will be described below.

Figure 3:
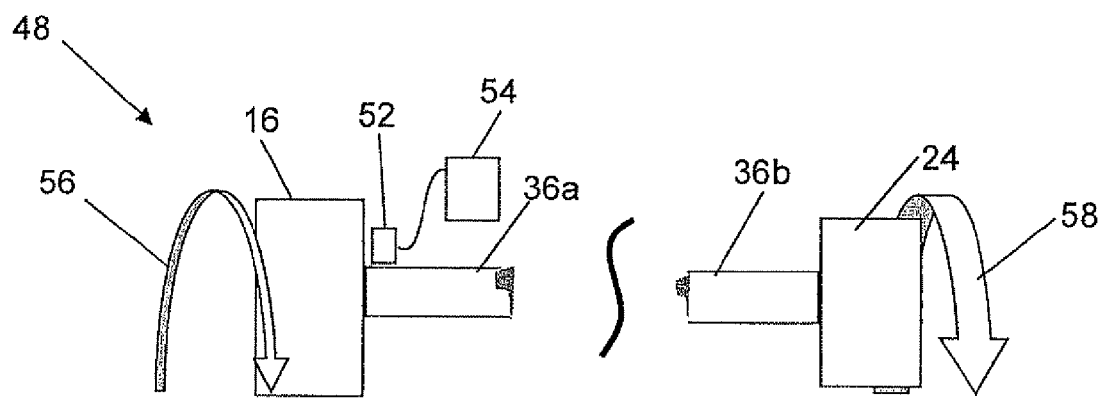

FIG. 3 shows the intermediate pressure shaft system 48 when the intermediate pressure shaft 36 has broken in a shaft break event. Thus the intermediate pressure shaft 36 comprises a first portion 36a that remains coupled to the intermediate pressure compressor 16 and a second portion 36b that remains coupled to the intermediate pressure turbine 24. Although drawn approximately equal in length, it will be apparent to the skilled reader that the first portion 36a and second portion 36b of the intermediate pressure shaft 36 may be different lengths depending on where the break occurs and the cause of the break. Equally the break may not be a clean break but may leave jagged ends to the first and second portions 36a, 36b.

In normal operation the turbine 24 drives the compressor 16 at a rotational speed resulting in the rotation 50 shown in FIG. 2. In the event of a shaft break the turbine 24 no longer drives the compressor 16 which therefore continues to rotate in the same direction but decelerates rapidly as indicated by arrow 56. Meanwhile the turbine 24 accelerates because it no longer experiences such a large load as indicated by arrow 58.

Figure 4:
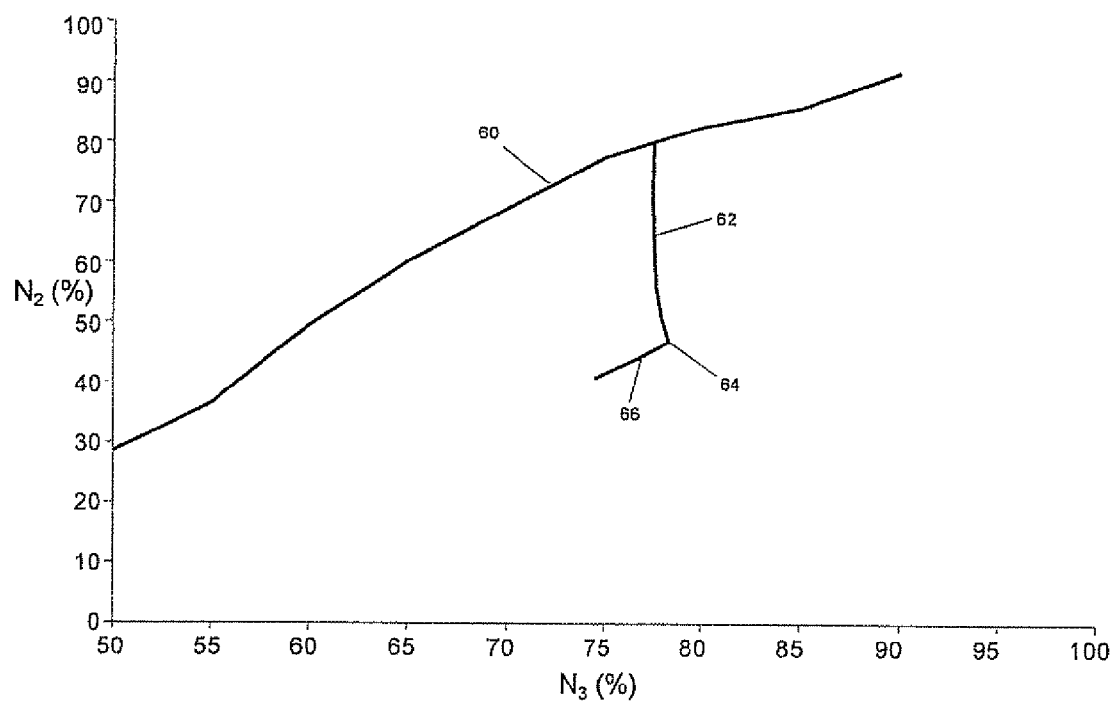
FIG. 4 is a plot of intermediate pressure shaft speed against high pressure shaft speed.

During operation of the gas turbine engine 10, the rotational speed ($N_2$) of the intermediate pressure shaft 36 can be measured by a first measurement device, the speed probe 52, and the rotational speed ($N_3$) of the high pressure shaft 38 can be measured by a second measurement device, another speed probe. The shaft speeds can be plotted against each other as shown in FIG. 4, where the scales are percentage of maximum shaft speed. Line 60 illustrates the typical normal relationship between $N_2$ and $N_3$, which is approximately linear. Usually, particularly for gas turbine engines 10 used to power passenger aircraft, engine power changes are gradual and the matching between $N_2$ and $N_3$ is maintained on or near line 60. For example, plotting $N_2$ against $N_3$ for normal deceleration of the engine 10 tracks towards the origin of FIG. 4 along line 60.

During some legitimate engine manoeuvres, for example surge, bleed offtake, power offtake and slam decelerations, the relative values of $N_2$ and $N_3$ may temporarily deviate from line 60. In these cases there is no fault in the engine 10 and the track of $N_2$ against $N_3$ will return to line 60 in due course. In the case of the intermediate pressure shaft 36 breaking, $N_2$ rapidly decreases because it is measured close to the intermediate pressure compressor 16. However, $N_3$ remains more or less unchanged, at least in the short term. Therefore, plotting $N_2$ against $N_3$ movement over a brief period of time shows rapid movement vertically downwards in FIG. 4 from line 60. This is shown on exemplary shaft break line 62. Once shaft break has been detected a signal is sent to the control system 46 which arranges for fuel supply to be shut-off to shut down the engine 10. Thus $N_3$ also decreases so an elbow 64 is apparent in the line 62 as it transitions to line 66 which tracks towards the origin of FIG. 4 as both the intermediate pressure shaft 36 and the high pressure shaft 38 spool down to stationary.

Thus to distinguish between normal engine running and shaft break events, the method of the present invention seeks to consider the change in each of the shaft speeds to determine whether the change of rotational speed of one shaft is matched by a change of rotational speed of the other shaft, or whether one changes rotational speed more rapidly than the other.

Figure 5:
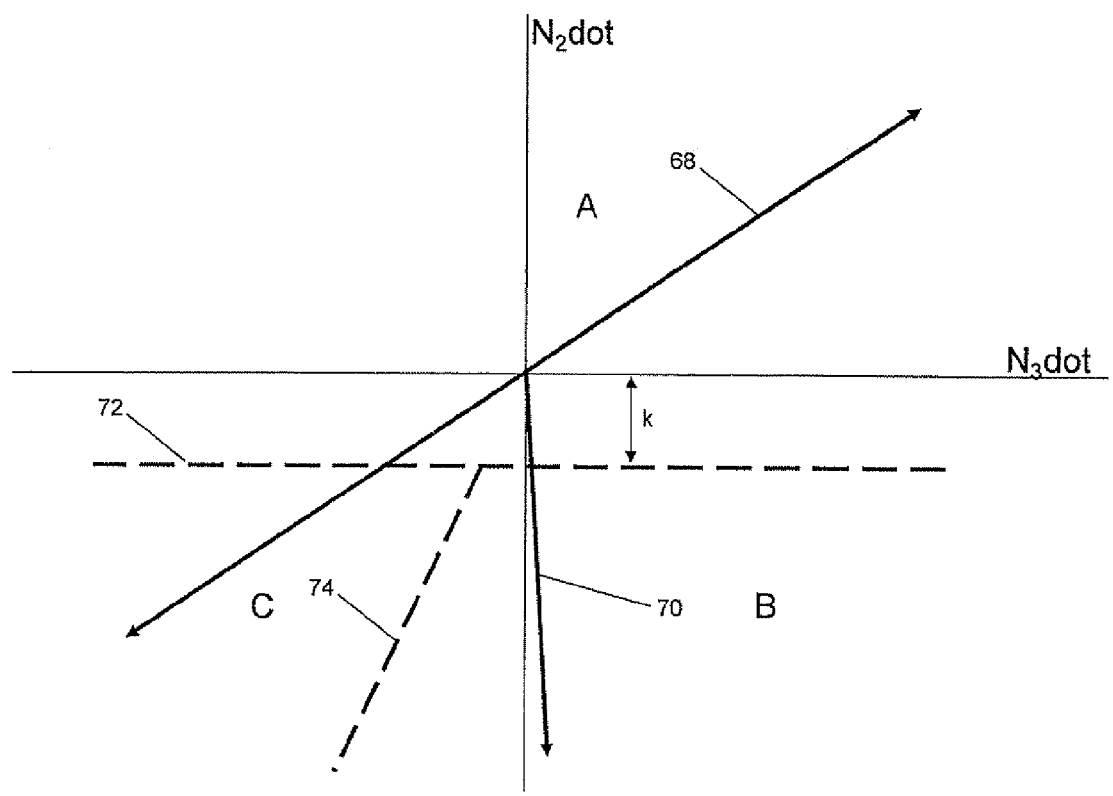
FIG. 5 is a plot of the gradient of intermediate pressure shaft speed against the gradient of high pressure shaft speed.

FIG. 5 is a graph of the two-dimensional parameter space defined as a function of the intermediate and high pressure shaft speeds, $N_2$ and $N_3$. Its axes being the gradient (differential) of the shaft speeds of the intermediate and high pressure shafts 36, 38. Thus the gradient of the intermediate pressure shaft speed is $\dot{N}_2$ (also known as $N_2$dot) and the gradient of the high pressure shaft speed is $\dot{N}_3$ (also known as $N_3$dot). During normal running of the engine 10, line 68 shows the matching between $\dot{N}_2$ and $\dot{N}_3$. During a shaft break event, the matching between $\dot{N}_2$ and $\dot{N}_3$ tracks down line 70 or a parallel line beginning at the appropriate point on line 68.

The two-dimensional parameter space is divided into integration regions A, B, C by divisions 72, 74. Thus division 72 sets a threshold level of $\dot{N}_2$, for example -k, for any value of $\dot{N}_3$ and divides the region A from the other regions B, C. The division 74 extends in the negative $\dot{N}_2$ and $\dot{N}_3$ directions from the division 72 and divides the region B from the region C. As shown in FIG. 5, the division 74 bisects the angle between the normal change of shaft speed matching line 68 and the shaft break event line 70. However, the division 74 may be at a different angle.

The method of the present invention defines an integration function for each integration region A, B, C. In integration region A the integration function has the form $\int(\dot{N}_2+k)dt$ so that it is saturated at zero, that is the result of the integral is forced to zero. The result of the integral is, generally, $\Delta N_2$. All normal engine running conditions will fall within integration region A. Potential shaft failures fall within integration region B. In integration region B the integration function has the form $\int \dot{N}_2 dt$ to amplify the differences between the normal engine running conditions and shaft failure events. The integration result $\Delta N_2$ plunges rapidly as it starts from zero due to the integration function in integration region A. In integration region C the integration function freezes the integral; thus no integration is performed in region C. The matching between $N_2$ and $N_3$ may enter integration region C during normal engine transients such as surge events and rapid decelerations, i.e. moving from integration region A into integration region C. When the engine transient event stabilises the matching returns to integration region A. Alternatively the matching between $N_2$ and $N_3$ may enter integration region C during a shaft break event, i.e. moving from integration region B into integration C. In this case the matching will subsequently return to integration region B, after a few samples (for example 50-200 ms), and $\Delta N_2$ will continue to increase in magnitude so that $\Delta N_2$ becomes more negative.

Figure 6:
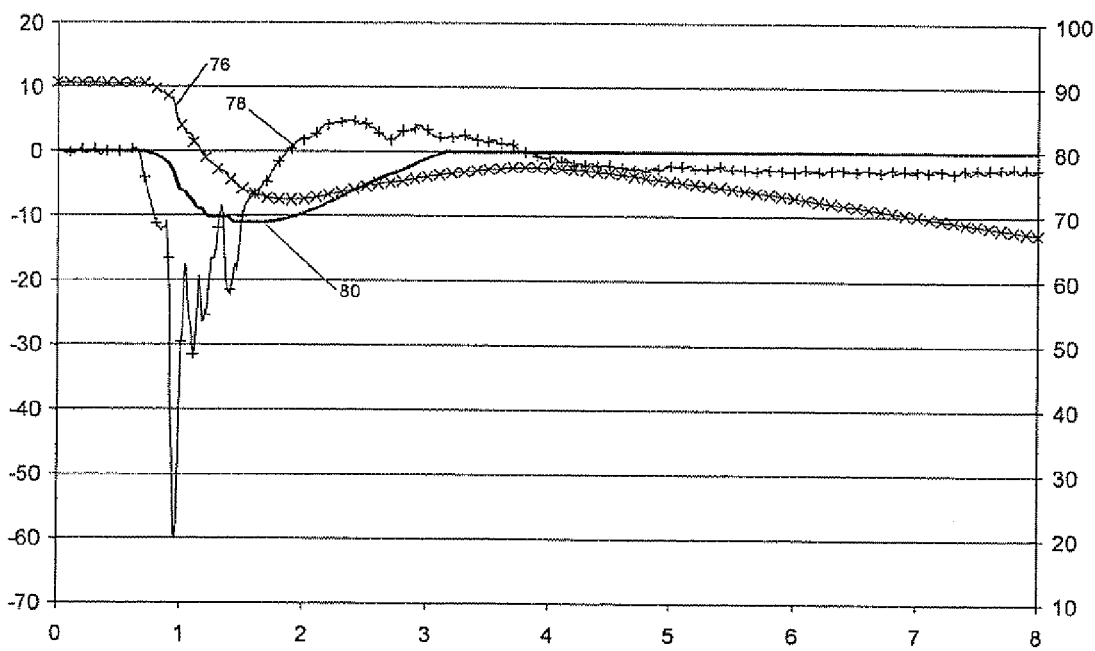
FIGS. 6 and 7 are each a plot of intermediate pressure shaft speed, rate of change of intermediate pressure shaft speed and calculated integral for a surge event and a shaft break event respectively.

FIG. 6 plots various values over time in seconds (x-axis) for an exemplary surge event. The y-axis on the left-hand side of the plot is the integral value and the rate of change of shaft speed $\dot{N}_2$. The y-axis on the right-hand side of the plot is the percentage speed. Line 76 shows the speed of the intermediate pressure shaft 36 which begins at a speed of 90%, falls away rapidly at the start of the surge event (within 1 second) but then recovers temporarily and then decreases at a steady rate from approximate 4 seconds after the surge began.

Line 78 plots the rate of change of the shaft speed, $\dot{N}_2$, which plummets significantly and very rapidly at the start of the surge event, recovers quickly and then plateaus when the rate of decrease of shaft speed stabilises. Finally line 80 plots the result of the integral, $\Delta N_2$. It can be seen that the line 80 is saturated at zero before the surge event, decreases to a minimum value around −11% at the start of the surge event and then recovers over approximately 2 seconds. Thereafter it is again saturated at zero.

Figure 7:
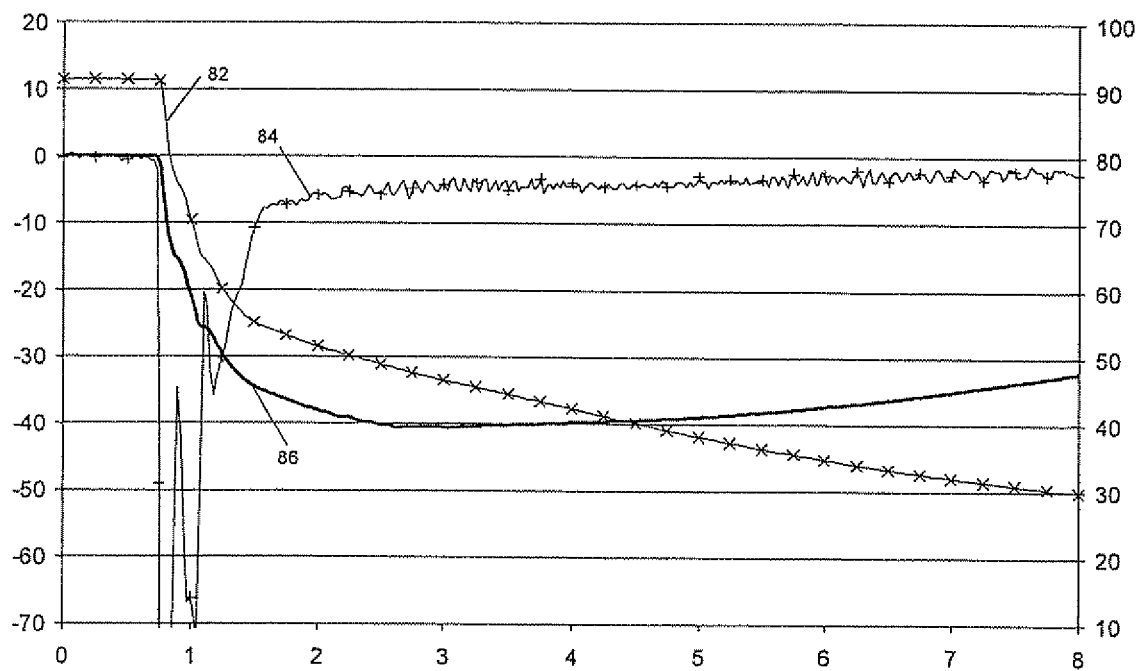

FIG. 7 is an equivalent plot to FIG. 6 for an exemplary shaft break event, Thus line 82 plots $N_2$ which plunges rapidly at the event, decreasing from 90% to approximately 55% within 1 second. The line 82 then stabilises to an approximately constant rate of decrease. Line 84 plots the rate of change of intermediate pressure shaft speed, $\dot{N}_2$. This plunges sharply at the shaft break event at an almost infinite gradient. It then recovers quickly over 1 second and plateaus or barely increases thereafter. Finally line 86 plots the result of the integral, $\Delta N_2$, which is saturated at zero before the shaft break event and then decreases rapidly so that it is below −30% within 1 second. $\Delta N_2$ continues to decrease until a minimum, −40, is reached around 2 seconds after the shaft break event. The integral result $\Delta N_2$ then gradually rises over a relatively long time period.

The method of the present invention sets a predetermined threshold to distinguish between surge and shaft break events to which the integral result $\Delta N_2$ is compared. Thus the threshold may be defined as −20%. This means that $\Delta N_2$ for the surge event does not reach the threshold but that $\Delta N_2$ for the shaft break event exceeds the threshold in a short enough period for the event to be controlled. More generally the threshold may be set between −15% and −30%. The threshold may be defined for each engine 10 from actual data or be defined for a particular type of engine 10. It will be understood that the threshold can be defined as any of a relatively wide range of possible values because the integral result $\Delta N_2$ for surge events and for shaft break events diverges quickly.

A shaft break signal is set to TRUE when the integration result $\Delta N_2$ exceeds the threshold. It will be understood that because the integration result $\Delta N_2$ and threshold are negative numbers the term "exceed" is used to mean of greater magnitude and not larger in absolute terms.

Optionally the method of the present invention may include a step wherein a counter is incremented when the threshold is exceeded and the shaft break event is only confirmed when the counter has reached a predetermined level. Advantageously this prevents false triggering when $\Delta N_2$ for a surge event briefly dips below the threshold.

Optionally the method of the present invention may be combined with another method of detecting shaft break. In this case, only when each method sets its shaft break signal to TRUE will a shaft break be indicated and appropriate action be taken, such as shutting off fuel flow to the engine 10. In this way, false triggering can be minimised.

The present invention also comprises a shaft break detection system which comprises elements to perform the method. The system includes a first measurement device to measure a first parameter and a second measurement device to measure a second parameter. For example, the measurement devices are rotational speed probes 52 and the parameters are the intermediate pressure and high pressure shaft speeds $N_2$, $N_3$. The integration functions associated with each integration region A, B, C are stored in memory. A processor, which may form part of or be coupled to the processor 54, the control system 46 or the EEC, is arranged to receive the measurements from the first and second measurement devices. The processor is also capable of determining the applicable integration region A, B, C dependent on the measurements and to apply the correct integration function to obtain the integration result $\Delta N_2$. The integration result $\Delta N_2$ is compared in a comparator, which may be a further function of the processor or an additional component, to a predetermined threshold. The result of the comparison is then passed to a shaft break signal generator which generates a shaft break signal if the integration result $\Delta N_2$ exceeds the threshold.

Preferably the shaft break detection system is coupled to a fuel shut-off mechanism to shut off fuel supply in response to a TRUE shaft break signal. Alternatively, a different arrangement to stop the engine 10 may be provided and may receive the shaft break signal as its input.

It will be apparent to the skilled reader that the elements of the shaft break detection system may be implemented in software. Alternatively they may comprise physical components. The shaft break detection system may be comprised within a control system, particularly the engine control unit. Preferably the shaft break detection system is comprised within a gas turbine engine 10, either as part of the engine control system or as an independent system which may interact therewith.

Although the two-dimensional parameter space of the method of the present invention has been described as a function of $N_2$ and $N_3$ it may alternatively comprise a function of different parameters. For example, it may be described as a function of $N_2$, the speed of the shaft for which a shaft break event must be detected, and $N_1$, the speed of another shaft in the gas turbine engine 10, or the overall pressure ratio of the gas turbine engine 10. Whichever parameters are used, the method of the present invention enables the trajectory in the two-dimensional parameter space (vector) to be used to characterise shaft break events and to distinguish them from other, normal, engine events including surge.

It may further be possible to define a third dimension in the parameter space to improve the accuracy and reliability of the method of the present invention. In this case more than three integration regions may be required or at least one integration region may be discontinuous.

Advantageously, the method of the present invention is insensitive to the state of the engine 10 because it calculates the trajectory in two-dimensional parameter space. Therefore, it is not necessary to record and take account of the initial conditions of the parameters when applying the method.

The integration functions in each of the integration regions A, B, C may comprise simple fault integrator counters instead of the described form of the integral. For example, such a fault integrator could count up in one region, down in a second region and be frozen in the third region.

Although the method of the present invention has been described with respect to detecting shaft break in the intermediate pressure shaft system 48, it is equally applicable to the high pressure shaft system comprising the high pressure compressor 18, the high pressure shaft 38 and the high pressure turbine 22 or to the low pressure shaft system comprising the fan 14, low pressure shaft 34 and the low pressure turbine 26.

The present invention has been envisaged for use in a gas turbine engine 10 for propelling an aircraft since the effects of shaft breakage are potentially catastrophic. However, the present invention also has utility for other types of gas turbine engine 10 including for marine applications and for industrial applications such as gas and oil pumping engines.

The invention claimed is:

1. A method to detect shaft break comprising:
    monitoring a first parameter and a second parameter;
    defining a two-dimensional parameter space that is a function of the first and second parameters, the two-dimensional parameter space comprising integration regions;
    defining an integration function for each integration region;
    for measured values of the first and second parameters, determining an applicable integration region of the integration regions and applying the integration function to the first parameter to give an integration result;
    incrementing a counter when the integration result crosses a predetermined threshold; and
    setting a shaft break signal to TRUE and reducing or stopping a drive to a shaft when the counter reaches a predetermined level.

2. A method as claimed in claim 1 wherein each of the first parameter and the second parameter comprises the derivative of a shaft speed.

3. A method as claimed in claim 2 wherein the first parameter comprises the derivative of the shaft speed of the shaft to which the method is applied and the second parameter comprises the derivative of the shaft speed of a different shaft.

4. A method as claimed in claim 1 wherein for one integration region of the integration regions, the integration function comprises integrating over time a sum of the first parameter and a constant to saturate an integral.

5. A method as claimed in claim 1 wherein for one integration region of the integration regions, the integration function comprises integrating over time the first parameter.

6. A method as claimed in claim 1 wherein for one integration region of the integration regions, the integration function comprises no integration to freeze an integral.

7. A method as claimed in claim 1 wherein the threshold is set to distinguish surge and shaft break events and is set within the range −15% to −30%.

8. A control system comprising the method as claimed in claim 1.

9. A gas turbine engine comprising the method as claimed in claim 1.

10. A gas turbine engine comprising the control system as claimed in claim 8.

11. A gas turbine engine as claimed in claim 10 wherein the method is applied to an intermediate pressure shaft system.

12. A shaft break detection system comprising:
    a first measurement device to measure a first parameter;
    a second measurement device to measure a second parameter;
    a two-dimensional parameter space defined as a function of the first and second parameters, the two-dimensional parameter space comprising integration regions;
    a memory comprising an integration function for each integration region;
    a processor to receive measured values of the first and second parameters from the first and second measurement devices, determine an applicable integration region of the integration regions from the two-dimensional parameter space and apply the integration function to obtain an integration result;
    a counter that is incremented when the integration result crosses a predetermined threshold; and
    a shaft break signal generator to generate a shaft break signal in order to reduce or stop a drive to a shaft when the counter reaches a predetermined level.

13. A shaft break detection system as claimed in claim 12 wherein the first and second measurement devices are rotational speed sensors to measure a shaft speed.

14. A shaft break detection system as claimed in claim 12 wherein the threshold is set to distinguish surge and shaft break events and is set in the range −15% to −30%.

15. A control system comprising the shaft break detection system as claimed in claim 12.

16. A gas turbine engine comprising a shaft break system as claimed in claim 12.

17. A gas turbine engine comprising the control system as claimed in claim 15.

18. A gas turbine engine as claimed in claim 17 wherein the first measurement device is coupled to an intermediate pressure shaft and the second measurement device is coupled to a high pressure shaft.

19. A gas turbine engine as claimed in claim 17 further comprising a fuel shut-off mechanism coupled to the shaft break signal generator, the fuel shut-off mechanism arranged to shut off fuel supply to the engine in response to the shaft break signal.

* * * * *